(12) United States Patent
Browne et al.

(10) Patent No.: US 12,317,185 B2
(45) Date of Patent: May 27, 2025

(54) ENERGY AWARE NETWORK SLICING

(71) Applicant: Intel Corporation, Santa Clara, CA (US)

(72) Inventors: John J. Browne, Limerick (IE); Chris M. MacNamara, Ballyclough (IE); David Hunt, Meelick (IE); Amruta Misra, Bangalore (IN); Tomasz Kantecki, Ennis (IE); Shobhi Jain, Shannon (IE); Liang Ma, Shannon (IE)

(73) Assignee: Intel Corporation, Santa Clara, CA (US)

( * ) Notice: Subject to any disclaimer, the term of this patent is extended or adjusted under 35 U.S.C. 154(b) by 988 days.

(21) Appl. No.: 17/119,698

(22) Filed: Dec. 11, 2020

(65) Prior Publication Data

US 2021/0136680 A1    May 6, 2021

(51) Int. Cl.
*H04W 52/02* (2009.01)
*H04L 41/5019* (2022.01)

(52) U.S. Cl.
CPC ..... *H04W 52/0203* (2013.01); *H04L 41/5019* (2013.01)

(58) Field of Classification Search
None
See application file for complete search history.

(56) References Cited

U.S. PATENT DOCUMENTS

| | | | | |
|---|---|---|---|---|
| 2012/0072746 A1* | 3/2012 | Sotomayor | ........... | G06F 1/3243 713/320 |
| 2012/0072749 A1* | 3/2012 | Conroy | ........... | G06F 1/3206 713/323 |
| 2013/0286026 A1 | 10/2013 | Kaburlasos et al. | | |
| 2014/0325183 A1* | 10/2014 | Rozen | ............ | G06F 15/76 712/30 |
| 2015/0106640 A1* | 4/2015 | Brackman | ........... | G06F 9/5094 713/324 |
| 2017/0245140 A1* | 8/2017 | Au | ........... | H04W 76/27 |
| 2019/0021016 A1* | 1/2019 | Radmand | ........... | H04L 43/16 |
| 2019/0265777 A1 | 8/2019 | Lee et al. | | |
| 2019/0364492 A1* | 11/2019 | Azizi | ........... | H04W 4/024 |
| 2020/0167205 A1 | 5/2020 | Bernat et al. | | |
| 2020/0178093 A1 | 6/2020 | Peng et al. | | |
| 2020/0225724 A1* | 7/2020 | Macnamara | ........... | G06F 1/3287 |
| 2020/0328944 A1* | 10/2020 | Zhang | ........... | H04L 41/0806 |

(Continued)

FOREIGN PATENT DOCUMENTS

CN    108063830 A    5/2018

OTHER PUBLICATIONS

EPO Communication Pursuant to Article 94(3) EPC in EP Application Serial No. 21198416.6 mailed on Mar. 11, 2024, 8 pages.

(Continued)

*Primary Examiner* — Christopher T Wyllie
(74) *Attorney, Agent, or Firm* — Alliance IP, LLC

(57) ABSTRACT

A system comprising an interface to access a network slice power consumption parameter for a network slice comprising a logical network between two endpoints through a plurality of physical computing platforms; and a controller comprising circuitry, the controller to specify operating parameters for a plurality of hardware resources of a first physical computing platform in accordance with the network slice power consumption parameter.

18 Claims, 9 Drawing Sheets

(56) References Cited

U.S. PATENT DOCUMENTS

| | | | |
|---|---|---|---|
| 2020/0363856 A1* | 11/2020 | Kulkarni | G06F 30/27 |
| 2021/0136680 A1* | 5/2021 | Browne | H04L 43/0852 |
| 2021/0158151 A1* | 5/2021 | Wang | G06N 3/08 |
| 2021/0182658 A1* | 6/2021 | Wang | G06N 3/045 |
| 2021/0235289 A1* | 7/2021 | Fitch | H04W 72/542 |
| 2021/0274512 A1* | 9/2021 | Bisaria | H04W 24/08 |
| 2021/0288918 A1* | 9/2021 | Sciancalepore | G06Q 10/00 |
| 2022/0011843 A1* | 1/2022 | MacNamara | G06F 11/3062 |
| 2022/0100247 A1* | 3/2022 | Garg | G06F 1/324 |
| 2022/0248238 A1* | 8/2022 | Melodia | H04W 24/02 |
| 2024/0405837 A1* | 12/2024 | Ali | H04B 7/0695 |

OTHER PUBLICATIONS

Kazunori Tanikawa NEC Japan: "Draft revised Recommendation Itu-T Y.3150: "High-level technical characteristics of network softwarization for IMT-2020";TD614/WP1", ITU-T Draft; Study Period 2017-2020; Study Group 13; Series TD614/WP1, International Telecommunication Union, Geneva ; CH, vol. 21/13 Jul. 29, 2020 (Jul. 29, 2020), pp. 1-35, XP044291061, Retrieved from: URL:https://www.itu.int/ifa/t/2017/sg13/exchange/wp1 /q21 /2007_Virtual/Draft/Final/TD614-Y.3150Rclean.docx [retrieved on Jul. 29, 2020]; 35 pages.

"An Introduction to Network Slicing," 2017 GSM Association; London, UK. (20 pgs.).

Barakabitze et al., "5G network slicing using SDN and NFV: A survey of taxonomy, architectures and future challenges." Computer Networks; vol. 167, Feb. 11, 2020, 106984 (40 pgs.).

Polychronopoulos, Constantine; "5G and Network Slicing: A New Era in Networking, Enabling IoT adoption at scale." VMWare, IEEE 5G World Forum, Jul. 2018. (19 pgs.).

EPO; Extended European Search Report issued in EP Patent Application No. 21198416.6, dated Feb. 21, 2022; 23 pages.

* cited by examiner

ENERGY AWARE NETWORK SLICING

BACKGROUND

Network slicing allows network operators to share a physical network infrastructure for deployment of network resources. From a mobile operator's point of view, a network slice is an independent end-to-end logical network that runs on a shared physical infrastructure. A network slice may be capable of providing an agreed service quality. The network operator guarantees performance (e.g., latency, loss, bandwidth, or radio resources) to meet the required service quality.

BRIEF DESCRIPTION OF THE DRAWINGS

Like reference numbers and designations in the various drawings indicate like elements.

DETAILED DESCRIPTION

Figure 1:
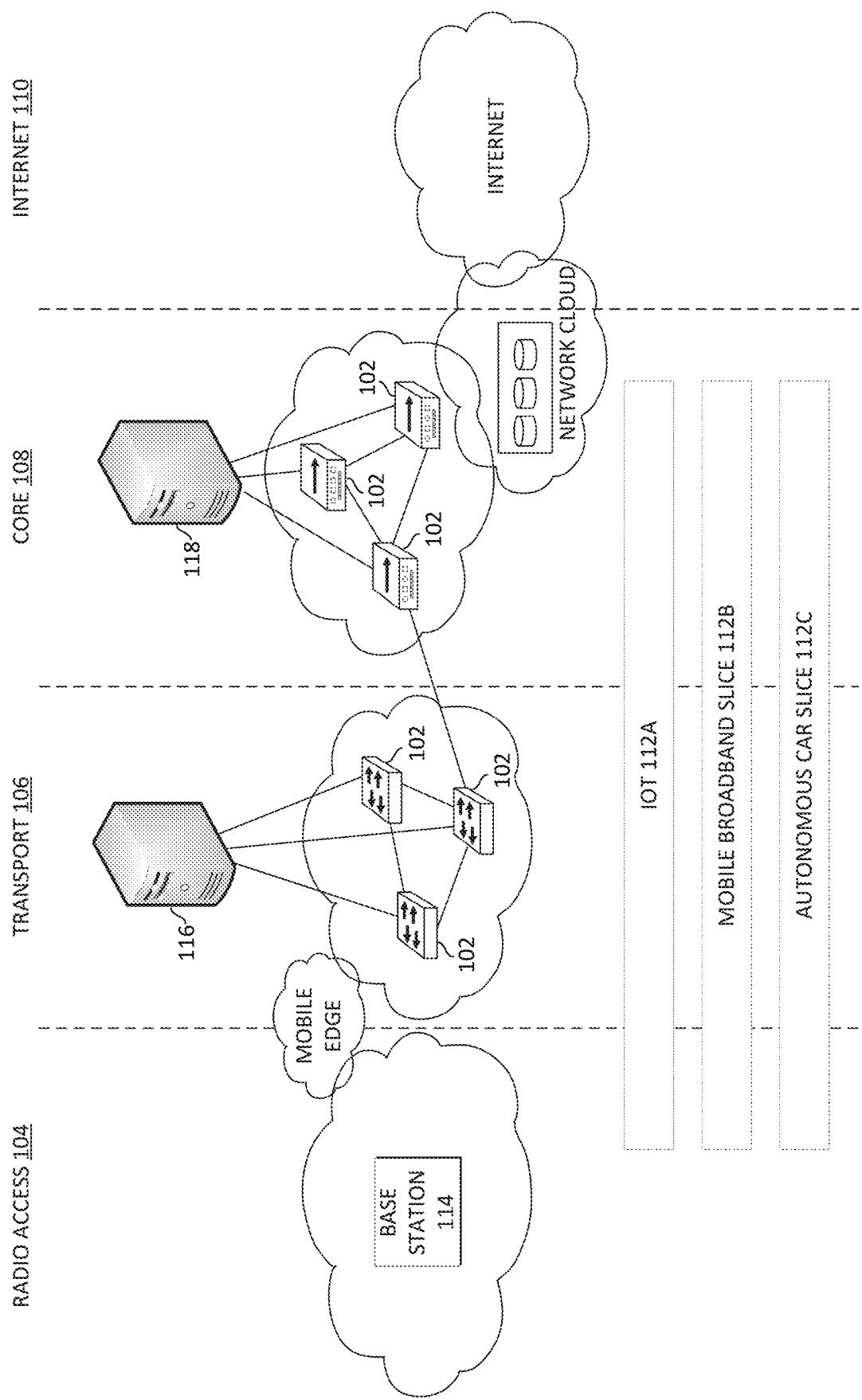
FIG. 1 illustrates a computer network utilizing energy aware network slicing in accordance with certain embodiments.

FIG. 1 illustrates a computer network 100 utilizing energy aware network slicing in accordance with certain embodiments. The computer network 100 includes any suitable networks, such as radio access network 104, transport network 106, core network 108, and internet 110. Each network may include any suitable network nodes 102 that may each comprise a physical computing platform. The network nodes 102 may be managed by software defined networking (SDN) controllers 116 and 118 (which may each comprise a single controller or a hierarchy of controllers).

In a network implementing network slicing, various services are deployed on a common physical infrastructure in accordance with certain embodiments. Use of a network platform infrastructure comprising various network nodes 102 may be shared among the various slices 112 that may include (for example): mobile broadband uses (e.g., telephone calls, entertainment, or Internet traffic), Internet-of-things (e.g., machine-to-machine communications, retail, shipping or manufacturing uses), reliable low latency communications (e.g., autonomous vehicle controls, medical equipment control or infrastructure control), or other applications. In the embodiment depicted, computer network 100 implements an IOT slice 112A, a mobile broadband slice 112B, and an autonomous vehicle slice 112C, although a network may implement any number or varieties of network slices 112.

As indicated above, a network slice 112 may be an end to end logical network running on a shared physical infrastructure. For example, one endpoint of the logical network of a slice 112 may be a base station 114 or access point while the other end may be a network node of the core network 108, although a network slice may be a logical network from any suitable node of a network (e.g., 100) to another node of the network. The source of the data that flows through the network slices can originate from any suitable source (e.g., a datacenter of a content provider for downstream data or from an endpoint device, such as a mobile phone handset or IOT device, for upstream data). A network slice may be isolated from other network slices running on the same network nodes. Each network slice may be independently controlled and managed. In some embodiments, each network slice may include respective programmable control and data planes. An operator may create various network slices to provide optimized solutions for various services that have diversified requirements. Network slices may be implemented using any suitable network communication technologies such as Intel® Scalable I/O Virtualization, Application Device Queueing (ADQ) (in which one or more queues of a network interface controller are dedicated to a particular execution thread (e.g., of an application or virtualized execution environment (VEE) such as a container or virtual machine)), similar technologies, or other suitable technologies.

The interconnected nodes 102 of network 100 may each perform processing on packets communicated through the network 100. Types of Packet processing. A network slice 112 may utilize resources of each (or a subset) of these network nodes 102 to implement a logical network between two endpoints. For example, a platform infrastructure can be sliced such that key hardware resources of the platform infrastructure, such as a processor unit (e.g., central processing unit (CPU), processor core, graphics processing unit, hardware accelerator, field programmable gate array, neural network processing unit, artificial intelligence processing unit, inference engine, data processing unit, or infrastructure processing unit), cache, accelerator, memory bandwidth, or network interface card resources are shared among multiple network slices to perform the operations of the respective slices.

Traditionally, networks have supported service level agreements (SLAs) for network slices, wherein the network guarantees certain service levels (e.g., for bandwidth parameters such as guaranteed bit rate and excess bit rate, packet delay variation, packet loss, packet latency) for one or more classes of traffic. Power usage is a critical consideration for multiple entities utilizing the network, such as network operators and service providers. Power usage characteristics of slices may significantly affect the operation of various network nodes throughout the network, including, for example, edge devices and platforms within the transport and core networks.

Various embodiments of the present disclosure provide systems and methods to enforce power SLAs for individual network slices running on network. Particular embodiments may provide for selection of specific computing platforms and CPUs to run energy efficient network slices, assignment of cores to run network slices within power constraints, a power aware controller which ensures the power consumed by a network slice on the platform does not exceed a specific power threshold for that network slice, and a power aware traffic manager which may adjust packet processing rates to ensure that power consumed by a network slice on a physical computing platform does not exceed a specific power threshold.

Figure 2:
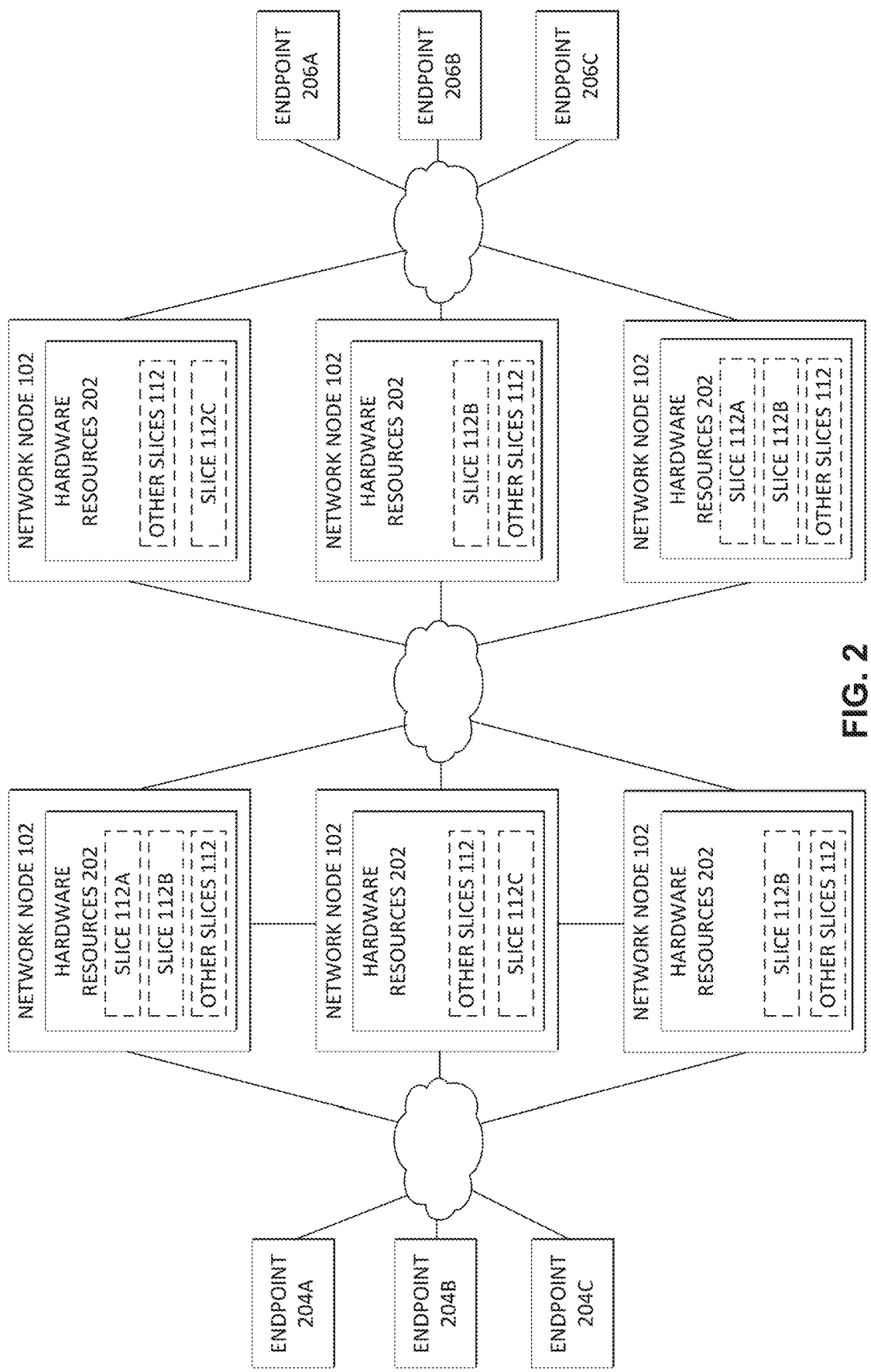
FIG. 2 illustrates physical platforms shared among network slices in accordance with certain embodiments.

FIG. 2 illustrates network nodes 102 shared among network slices in accordance with certain embodiments. Each network node 102 may comprise a physical computing platform operable to process packets sent between endpoints 204 and 206. Each network node 102 comprises hardware resources 202 that may be shared by slices 112.

In the embodiment depicted, network slice 112A may implement a logical network between endpoint 204A and endpoint 206A, network slice 112B may implement a logical network between endpoint 204B and endpoint 206B, and network slice 112C may implement a logical network between endpoint 204C and endpoint 206C.

Hardware resources 202 may comprise any suitable computer hardware components. For example, hardware resources 202 may include, for example, CPUs each comprising one or more processing cores, caches, accelerators, memories, or network interface cards. In some embodiments, hardware resources comprise an uncore. In various embodiments, the uncore (sometimes referred to as a system agent) may include any suitable logic that is not a part of core. For example, uncore may include one or more of a last level cache, a cache controller, an on-die memory controller coupled to a system memory, a processor interconnect controller (e.g., a Quick Path Interconnect or similar controller), an on-die 110 controller, or other suitable on-die logic. In particular embodiments, the uncore may be in a voltage domain and/or a frequency domain that is separate from voltage domains and/or frequency domains of the cores. That is, the uncore may be powered by a supply voltage that is different from the supply voltages used to power the cores and/or may operate at a frequency that is different from the operating frequencies of the cores.

Figure 3:
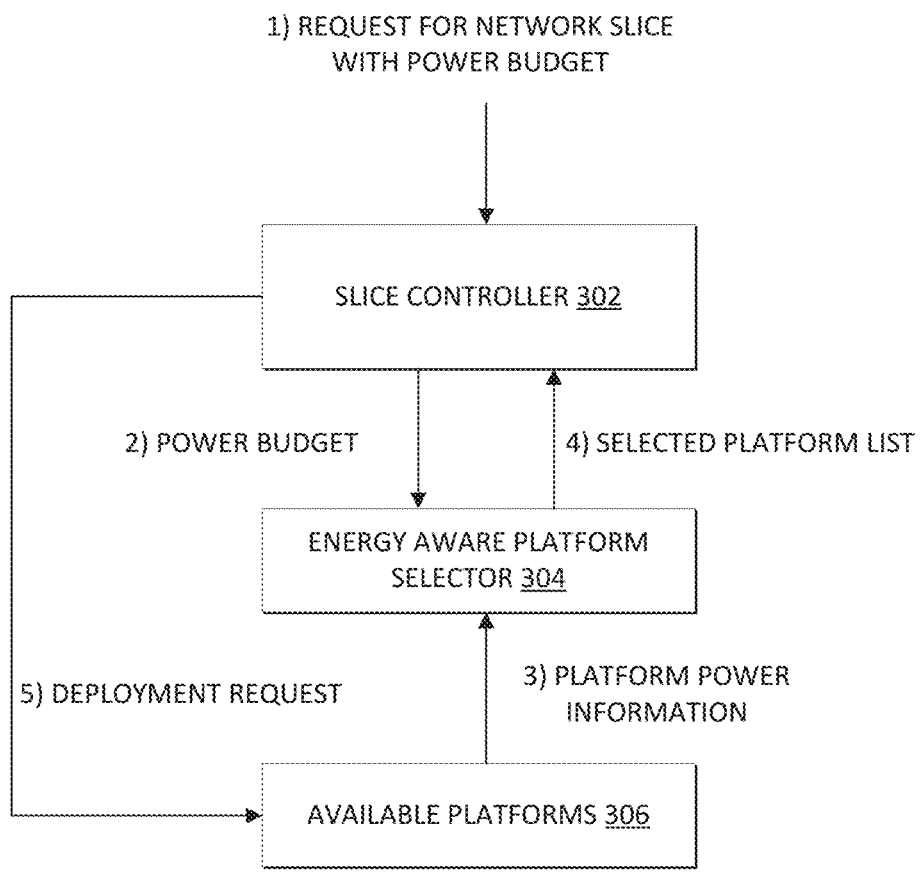
FIG. 3 illustrates a flow for deploying a network slice based on a power budget in accordance with certain embodiments.

FIG. 3 illustrates a flow 300 for deploying a network slice 112 based on a power budget in accordance with certain embodiments. In the embodiment depicted, various computing systems (e.g., slice controller 302, energy aware platform selector 304, and available platforms 306) communicate with each other to enable deployment of the network slice, though in other embodiments, any suitable computing systems or components may perform the illustrated communications (or variants thereof).

Slice controller 302 is operable to receive requests to create network slices and to communicate with network nodes 102 or controllers to cause deployment of the requested network slices. In various embodiments, the slice controller 302 may be a software defined networking (SDN) controller (e.g., 116, 118), a network slice controller (e.g., 5G network slice controller), a network slice selector (e.g., 5G network slice selector), an orchestration and management controller, or other suitable controller. In some embodiments, slice controller 302 may comprise a hierarchy of controllers. For example, slice controller 302 may be implemented by a central SDN controller that is coupled to one or more edge SDN controllers (e.g., that are in communication with network nodes in an edge portion of the network 100), core SDN controllers (e.g., that are in communication with network nodes in the core section of the network 100), and/or data center SDN controllers (e.g., that are in communication with network nodes in a data center).

Energy aware platform selector 304 is operable to select one or more platforms to implement a network slice based on power consumption parameters for the network slice and other constraints (e.g., as defined by an SLA) for the network slice. In order to do so, energy aware platform selector 304 may communicate with slice controller 302 to determine the requirements for the network slice and communicate with available platforms 306 to determine the capabilities of the platforms in order to select suitable platforms to implement the network slice. In some embodiments, energy aware platform selector 304 may be integrated with slice controller 302.

Flow 300 begins when a request for a network slice with an associated power budget is received at the slice controller 302. The request may be sent by any suitable entity, such as a tenant of the network 100 or other entity that may use the network slice or manage the network slice on behalf of other users.

The request may specify various parameters for the network slice, such as conventional service level agreement (SLA) parameters (e.g., for bandwidth parameters such as guaranteed bit rate and excess bit rate, packet delay variation, packet loss, packet latency, etc. for one or more classes or types of network traffic) as well as a power budget for the network slice. Any suitable energy efficiency parameters may be specified in the power budget for the end-to-end network slice, such as one or more of an average power (e.g., in terms of watts), a maximum power for the network slice, an average power plus maximum power, a maximum power to be consumed in an idle period, a specification of what constitutes an idle period, a maximum power to be consumed during a busy period, a specification of what constitutes a busy period, or other suitable energy efficiency parameters applicable to the end-to-end network slice.

In a second communication, the slice controller 302 communicates the power budget for the network slice to the energy aware platform selector 304. In a third communication, the slice controller 302 receives power information (e.g., platform telemetry, capabilities, policies, etc.) from various available physical computing platforms 306. In some embodiments, the selector 304 may be in communication with each platform directly or through one or more other network nodes, such as a management server which may aggregate the information from multiple available platforms and then send the information to the energy aware platform selector 304. In various embodiments, the selector 304 receives information from a platform responsive to a request sent to the platform 306 from the selector 304. Additionally or alternatively, the platforms 306 may send this information to the selector 304 at periodic intervals or responsive to any suitable trigger.

The platform power information sent from an available platform 306 to the energy aware platform selector 304 in the third communication may include one or more of platform power telemetry data, platform power capabilities, platform power policies, frequency information per core of the platform, or other suitable information related to power usage or capabilities of the respective platform.

The platform power telemetry data may include one or more of current power measurements per hardware resource (e.g., CPU) of the platform, current power measurements of the entire platform (e.g., including CPUs, other processors or accelerators, power supply unit, memory, fans or other cooling units, or other suitable hardware), e.g., as measured by Redfish®/Intelligent Platform Management Interface (IPMI) or in another suitable manner, frequency measurements per core, and available TDP headroom (where TDP headroom is the difference between used watts on the platform or a hardware resource thereof and maximum watts available). In some embodiments, the number of available cores with the required minimum frequencies and available power headroom (e.g., peak and average) may also be included in the platform power telemetry data. Any other power telemetry data described herein (e.g., in conjunction with FIG. 4) may be reported to the energy aware platform selector 304.

The platform power capabilities may include indications of power features available on the platform. For example, the platform power capabilities may describe which CPUs are equipped with speed select technology (SST) (e.g., a technology in which the base frequency of a core may be modified such that the base frequencies of cores of a processor may be different), turbo boost capabilities, or other variable power usage capabilities.

Platform power policies may indicate which power policies are available on the respective platform to control power usage. For example, such policies may include one or more sleep modes, a balanced performance mode (that attempts to balance high performance with low power usage), a high performance mode, or other suitable performance modes.

The frequency information per core may indicate the available frequencies at each core of the platform. For example, this information may indicate the frequency range of a core (e.g., its minimum and maximum frequencies). This information could also include the frequency step size or other information indicating which frequencies in between the minimum and maximum frequencies are available per core. Available frequencies of other hardware components (e.g., network interfaces, memories, or accelerators) could also be included in the information sent to selector 304.

After analyzing the power budget for the slice and the platform power information, the energy aware platform selector 304 may select platforms that are capable of collectively staying within the specified power budget for the network slice and may then inform the slice controller 302 of the selection in a fourth communication.

In association with the selection of the platforms 306 to implement the network slice, the energy aware platform selector 304 or slice controller 302 (or other associated computing entity) may determine individual network slice power consumption parameters for each platform that is selected to implement the network slice based on the overall power budget for the network slice. For example, if the power budget specifies an average wattage for the network slice, then the selector 304 or slice controller 302 may divide the average wattage up among the platforms to implement the network slice such that the sum of the average wattages for the selected platforms (when performing operations for the network slice) does not exceed the average wattage for the entire network slice. As another example, a maximum wattage (e.g., during a burst period) or a minimum guaranteed wattage for the network slice may be allocated in a similar fashion. The power budget may be allocated among the different platforms in any suitable manner. For example, the portion of the power budget allocated to each platform may be based on any suitable factors, such as the processing operations that the respective platform will be performing for the network slice (e.g., a platform to perform more intensive packet processing operations may be allocated more budget than a similar platform that is to perform less intensive operation), the hardware characteristics of the platform (e.g., a platform that includes hardware consuming relatively low power may be allocated less power budget a platform that includes hardware consuming relatively high power for similar processing operations), or other suitable factors. In various embodiments, multiple platforms may be allocated equal or unequal portions of the power budget.

Example network slice power consumption parameters are described in more detail in connection with FIG. 4 below. In various embodiments, the selection of the platforms to implement the slice is also based on other parameters requested for the network slice (e.g., SLA parameters such as bandwidth, latency, jitter, packet loss, etc. specified for one or more classes or types of traffic). In doing so, the selection of the platforms (as well as the assignment of the platform specific network slice power consumption parameters) may seek to balance performance with energy efficiency. For network slices that are flexible with respect to performance demands, an aggressive approach may be taken on power saving, while network slices that require high performance may focus instead on placement in higher performing platforms with larger power requirements. As one example, for a particular network slice, the selector 304 may select a platform that can implement a low power state but is also able to handle bursts in traffic (e.g., a platform with a CPU that has turbo boost capabilities). As another example, slices least tolerant to latency and packet loss may be assigned to the highest frequency cores. In general, the network slice power consumption parameters may be set to minimize power usage while still ensuring that the performance requirements (such as latency and packet loss) of the SLA associated with the network slice are met.

Once the slice controller 302 receives the selected platform list from the energy aware platform selector 304, the slice controller 302 communicates with the selected platforms to cause the network slice to be instantiated on the selected platforms according to the power budget associated with the network slice.

Figure 4:
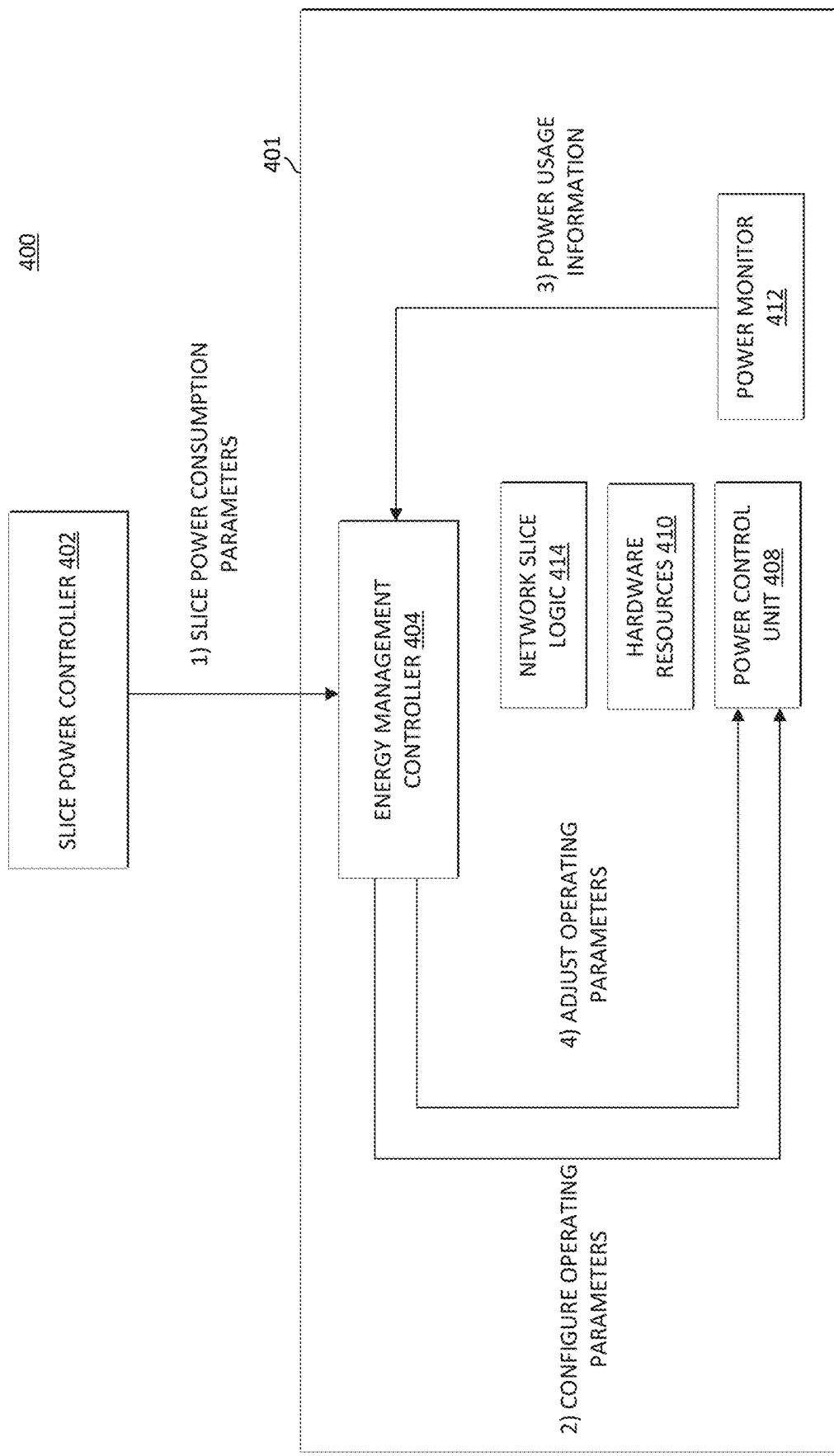
FIG. 4 illustrates a flow for configuring and adjusting platform operating parameters for a network slice in accordance with certain embodiments.

FIG. 4 illustrates a flow 400 for configuring and adjusting platform operating parameters for a network slice 112 in accordance with certain embodiments. In the embodiment depicted, various logic (e.g., slice power controller 402 and various components of a computing platform 401) is depicted, though in other embodiments, any suitable computing systems or components may perform the illustrated communications (or variants thereof).

The slice power controller 402 may comprise any suitable computing system. In a particular embodiment, the slice power controller 402 is the same computing entity as (or is in communication with) the slice controller 302 or the platform selector 304. Platform 401 represents an example implementation of a network node 102. Platform 401 includes an energy management controller 404, a power control unit (PCU) 408, hardware resources 410 (which may correspond to hardware resources 202), power monitor 412, and network slice logic 414 (which represents logic to enable hardware resources 410 to perform processing and other operations for a network slice 112).

In a first communication of flow 400, the slice power controller 402 sends one or more network slice power consumption parameters to an energy management controller 404 of the computing platform 401. In some embodiments, the network slice power consumption parameters may be received at the platform 401 together with or in conjunction with a request to implement a network slice 112.

In various embodiments, the network slice power consumption parameters may include any suitable power consumption parameters based upon the power budget specified for the network slice. A network slice power consumption parameter may be specific to a particular platform 401, thus other platforms that are used in conjunction with the particular platform 401 to implement the network slice may have their own respective network slice power consumption parameters for the network slice.

The network slice power consumption parameters include one or more parameters that are to constrain the operation of the platform 401 in performing operations of the associated network slice 112. At least some of these power consumption parameters may be specific to performance of operations for the particular slice 112 (as opposed to operations performed by the platform 401 for other network slices, which may be associated with other respective network slice power consumption parameters). For example, the network slice power consumption parameters may include one or more of a maximum burst power for the slice, an average power for the slice, shared power usage information, power usage priority information, exceeded power threshold behavior information, an overall power budget for a CPU, an overall power budget for the platform 401 (including, e.g., power usage by one or more CPUs, other processors or accelerators, a power supply unit, memory, fans or other cooling units, or other suitable hardware resources 410).

The maximum burst power may be the maximum burst power for the entire platform 401 or a portion thereof (e.g., for one or more CPUs) when performing operations of the network slice 112. The average power may be the average power for the entire platform 401 or a portion thereof (e.g., for one or more CPUs). The shared power usage information may include conditions under which the network slice 112 may utilize power (e.g., during a burst) from a shared power amount after the network slice 112 has exceeded a guaranteed amount of power of the platform 401 for the network slice 112. The power usage priority information may specify a priority for the slice relative to priorities of the other slices running on the platform 401 when multiple slices are contending for limited resources (wherein one of the limited resources may be power). The exceeded power threshold behavior information may specify one or more actions to take if all cores of the platform 401 have exceeded their available power budget. For example, this information may specify that if an overall power budget is exceeded, then all cores should be capped at one or more particular frequencies or one or more certain cores should be prioritized over other cores such that they may run at relatively high frequencies relative to the other cores. The overall power budget for a CPU may indicate a total power budget (e.g., across all slices) for a CPU. The overall power budget for the platform 401 may indicate a total power budget for the platform for all slices implemented by the platform 401 (to protect against exceeding an overall power budget limit as power is allocated to individual slices).

The energy management controller 404 receives the network slice power consumption parameters and determines operating parameters for hardware of the platform 402 based on the power consumption parameters. For example, for each core to perform processing on behalf of the network slice 112, a lowest base frequency and a starting frequency may be determined. The lowest base frequency may be the lowest frequency at which the core is to operate when performing processing for the network slice 112 while the starting frequency may be different from or the same as the lowest base frequency and is the frequency at which the core is set to when it begins to perform processing for the network slice 112. As another example, one of the operating parameters may be an uncore frequency. As yet another example, an operating parameter may specify whether advanced vector instructions (AVX) instructions may be executed by one or more of the cores.

In a second communication, the energy management controller 404 communicates the configured operating parameters to the PCU 408, which applies the operating parameters to the specified hardware at the appropriate time (e.g., when the network slice begins operation). In various embodiments, PCU 408 may control the supply voltages and the operating frequencies applied to each of the cores (e.g., on a per-core basis) and to an uncore. PCU 408 may also instruct a core or uncore to enter an idle state (e.g., where no voltage and clock are supplied) when not performing a workload. PCU 408 may cause a core or uncore to enter any other suitable state or mode. In various embodiments, the operating parameters may include any other suitable parameters associated with the hardware resources (e.g., frequencies or voltages of accelerators, graphics processing units, vector processing units, or other suitable parameters).

In a third communication, a power monitor 412 of the platform communicates power usage information to the energy management controller 404. The power usage information may include any suitable power usage information that may be reported by the platform 401. For example, the power usage information may include one or more of an operating frequency per core of the platform, power consumption per core, power consumption of system memory (e.g., DRAM), power consumption of a network interface (e.g., a NIC), power states of a network interface, power consumption of an accelerator, power consumption of a GPU, power consumption of a VPU, aggregated power consumption of the platform (e.g., due to CPU, memory, storage, cooling, etc.), overall power draw of platform 401 (e.g., as measured by input to a power supply unit, also referred to as wall power), uncore frequency, power consumption of the uncore, or other suitable power consumption parameter. In various embodiments, the energy management controller 404 may also receive an indication of whether a core is executing AVX instructions.

Even though the energy management controller 404 specifies some of these operating parameters (e.g., operating frequencies), some of these parameters may vary from the set values based on actual operating conditions (and thus the feedback from the power monitor may be valuable in achieving accurate assessment of the power usage of the platform 401 and components thereof). For example, an operating frequency for a core may be set, but the actual frequency achieved may be lower than the set frequency due to the processor limiting the frequency due to execution of power heavy instructions such as AVX instructions or due to turbo power limiting or other factors.

The energy management controller 404 receives the power usage information and checks the power usage information against one or more of the network slice power consumption parameters to determine whether the power consumption associated with the network slice 406 is acceptable. If the power consumption is too high, the green energy controller may adjust one or more of the operating parameters to reduce the power consumption associated with the network slice 406. If the power consumption is acceptable, the green energy controller may maintain the same operating parameters or may modify one or more operating parameters to improve performance if suitable power headroom exists. Any adjusted operating parameters may be communicated from the energy management controller 404 to the power control unit 408 in a fourth communication. In one embodiment, when lower power usage is desired, an uncore frequency may be reduced before core frequencies are reduced.

Particular hardware resources (e.g., cores) 410 of the platform may be dedicated to a slice or may be time shared among multiple slices. When hardware resources are time shared among multiple slices, the energy management controller 404 or other platform logic may track the times that the hardware resources 410 are used by the particular network slice 406 in order to determine the power usage attributable to the network slice based on the power usage information received from the power monitor 412.

The energy management controller 404 may perform communications similar to those depicted for any number of network slices running on the platform 401. In some embodiments, the energy management controller 404 may be executed by the platform 401 and may perform the illustrated power monitoring operations specific to the platform 401. In other embodiments, an energy management controller 404 may perform the illustrated power monitoring operations for multiple different platforms 401.

Figure 5:
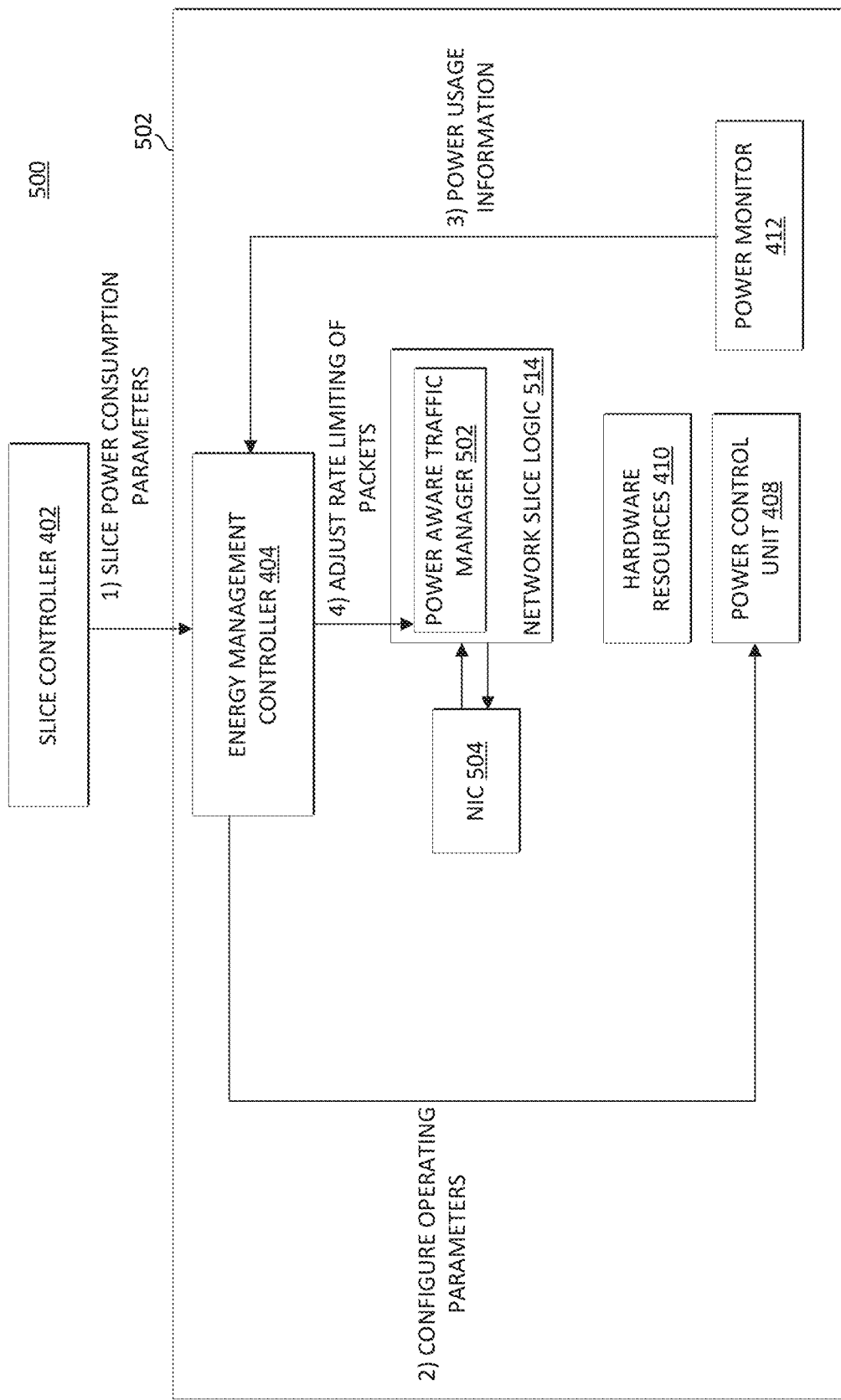
FIG. 5 illustrates a flow for adjusting packet processing rates for a network slice based on power usage in accordance with certain embodiments.

FIG. 5 illustrates a flow 500 for adjusting packet processing rates for a network slice based on power usage in accordance with certain embodiments. The flow 500 is similar to flow 400, but in flow 500 the power consumption may be changed by policing or shaping network packets by power aware traffic manager 502. This could be done in addition to or as an alternative to changing the operating parameters as described in connection with flow 400 to control power usage in accordance with the network slice power consumption parameters. In flow 500, after network slice power consumption parameters are sent to energy management controller 404 and the operating parameters are sent to power control unit 408, energy management controller 404 may determine whether power usage should be decreased for the network slice 112 based on the power usage information.

Responsive to determining that power usage should be decreased for the network slice 112, the power aware traffic manager 502 may cause incoming packets received from NIC 504 that are associated with the network slice 112 to be queued for future processing by the hardware of the platform 502 (e.g., during a time in which less power is being consumed on the platform by the network slice 112 such that the processing of the queued packets will not cause violation of the network slice power consumption parameters) or dropped altogether such that they are not processed by the hardware resources 410 of the platform 502. In some embodiments, the power aware traffic manager 502 may selectively block or limit (either by rate limiting and/or selectively buffering and processing after a time delay via traffic shaping) certain packets (such as packets of lower priority classes) while processing other packets (such as packets of higher priority classes). In the embodiment depicted, the power aware traffic manager 502 is implemented as part of the network slice logic 514 (which may be similar to network slice logic 414). In various embodiments, the traffic manager 502 may be implemented on the platform itself (e.g., may be implemented by software executed by the platform 502 or may be implemented on the NIC 504, e.g., when NIC 504 is a smart NIC) or may be external to the platform (e.g., on an external load balancer).

Figure 6:
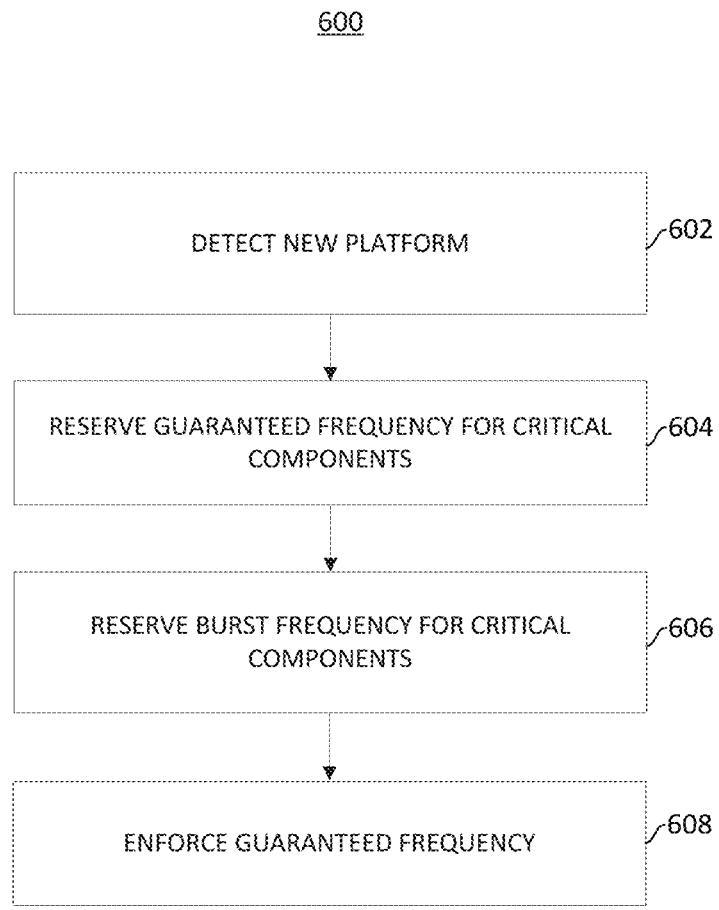
FIG. 6 illustrates a flow for critical component power allocation in accordance with certain embodiments.

FIG. 6 illustrates a flow 600 for critical component power allocation in accordance with certain embodiments. Operations of the flow may be performed by any suitable logic, such as a slice controller 302, the platform itself, or other suitable logic. At 602, a new platform that is operable to perform processing for one or more network slices is detected. At 604, guaranteed frequency is reserved for critical components that support general operation and management of the platform. For example, core frequency (or other suitable hardware resources) may be reserved for one or more of an operating system, network stack, virtual switch, and one or more management interfaces. The critical components may allow the platform to communicate with other network nodes (e.g., other platforms, slice controller 302, energy aware platform selector 304, etc.) and to allow the platform to perform processing for network slices. In some embodiments, a separate core may be dedicated for each of these critical components (e.g., one core to execute the operating system, another core to execute the network stack, and so on), although other arrangements are contemplated herein. At 606, burst frequency is reserved for the critical components. Once the guaranteed frequency and the burst frequency have been reserved the for the critical components, the remaining frequency may be allocated for use by the network slices. The guaranteed frequency is enforced at 608 by ensuring that the guaranteed frequency is always available for use by the critical components. For example, the frequency of a specific core or set of cores may be enforced by explicitly changing the core frequencies by writing to the operating system interface or setting the power policy of an operating system power governor subsystem.

Figure 7:
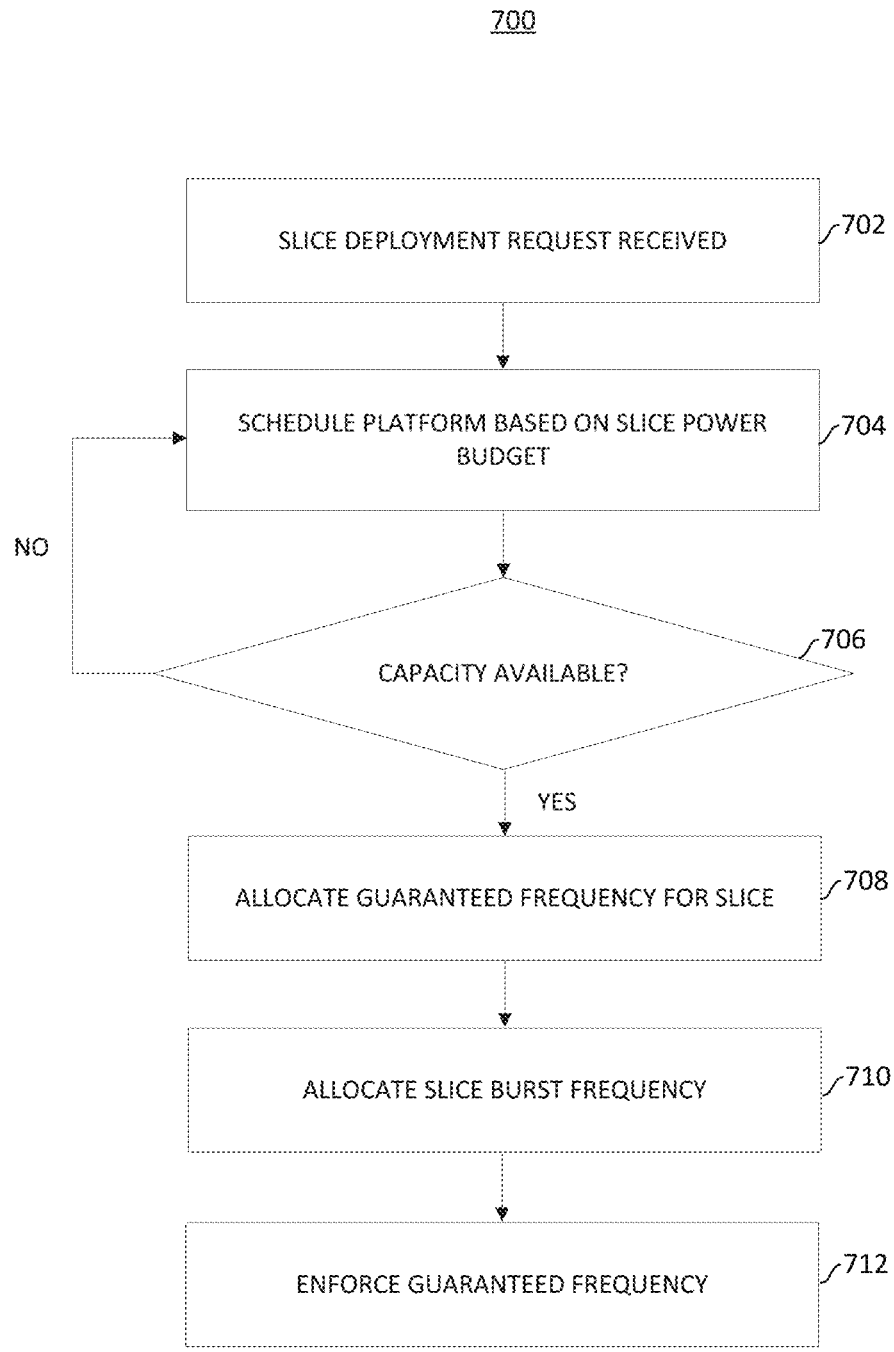
FIG. 7 illustrates a flow for slice power allocation in accordance with certain embodiments.

FIG. 7 illustrates a flow 700 for slice power allocation in accordance with certain embodiments. Any suitable logic (or a combination thereof) of system 100 (e.g., slice controller 302, energy aware platform selector 304, energy management controller 404, or other logic) may perform the operations of flow 700. At 702 a slice deployment request is received. For example, the slice deployment request may be a request to deploy a virtual network function (VNF).

At 704, hardware resources of the platform are scheduled based on the power budget associated with the network slice. In various embodiments, this may include examining all the available platforms and then selecting from a list a platform which meets the parameters below and then scheduling a workload for the network slice on the selected platform (such as described above in connection with FIG. 3). In various embodiments, this operation may be performed in an orchestration system such as one available from Openstack®, Kubernetes, or VMware®.

At 706 a determination is made as to whether capacity for the network slice is available. If capacity is not available, then implementation of the network slice may be delayed and the flow may return to 704 (where the scheduling could be modified if appropriate). Once capacity is available at 706, then guaranteed frequency (e.g., core frequency) is allocated for the slice at 708 and slice burst frequency is allocated at 710. The guaranteed frequency is then enforced at 712.

Figure 8:
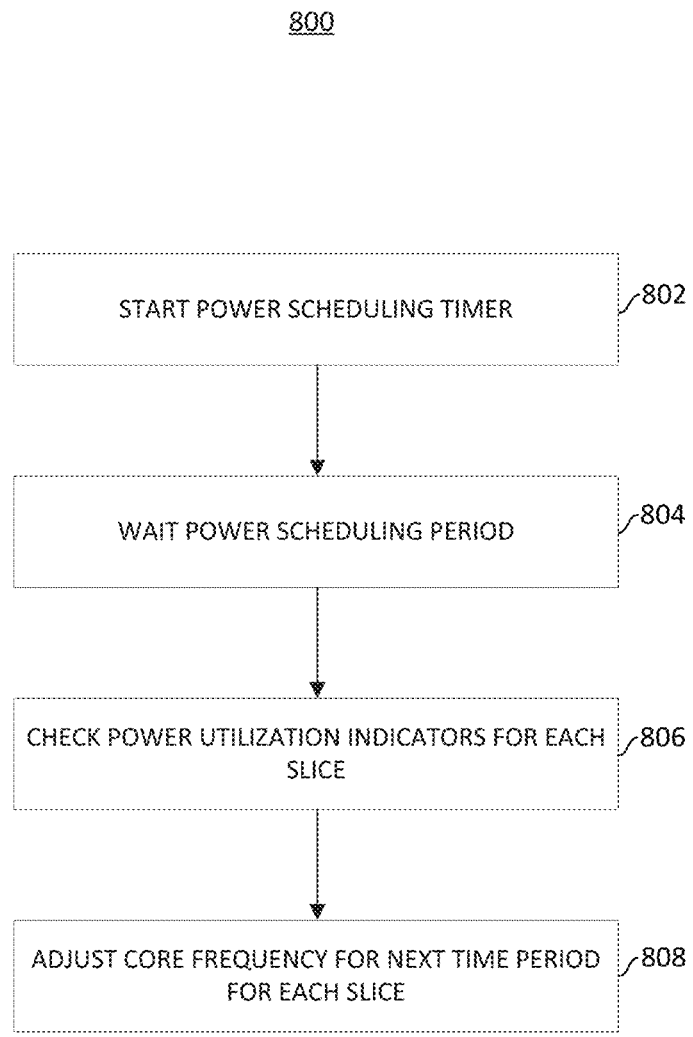
FIG. 8 illustrates a flow for resource scheduling in accordance with certain embodiments.

FIG. 8 illustrates a flow for resource scheduling in accordance with certain embodiments. The operations of flow 800 may be performed by any suitable logic, such as energy management controller 404.

At 802, a power scheduling timer is started. At 804, a power scheduling period is waited. After the period has passed, the flow moves to 806 where power utilization indicators are checked for each network slice for which the platform processes packets. For example, the power utilization indicators may be derived from the power usage information sent from the power monitor 412 to the energy management controller 404 (as described, e.g., in FIG. 4). The power utilization indicators for each slice may then be checked against the respective network slice power consumption parameters to determine if power consumption of the slice should be changed. At 808, one or more core frequencies may be adjusted for the next time period for each slice. In other embodiments, other adjustments may be made to the hardware resources for the network slices (as described above). The flow may repeat any number of times.

Figure 9:
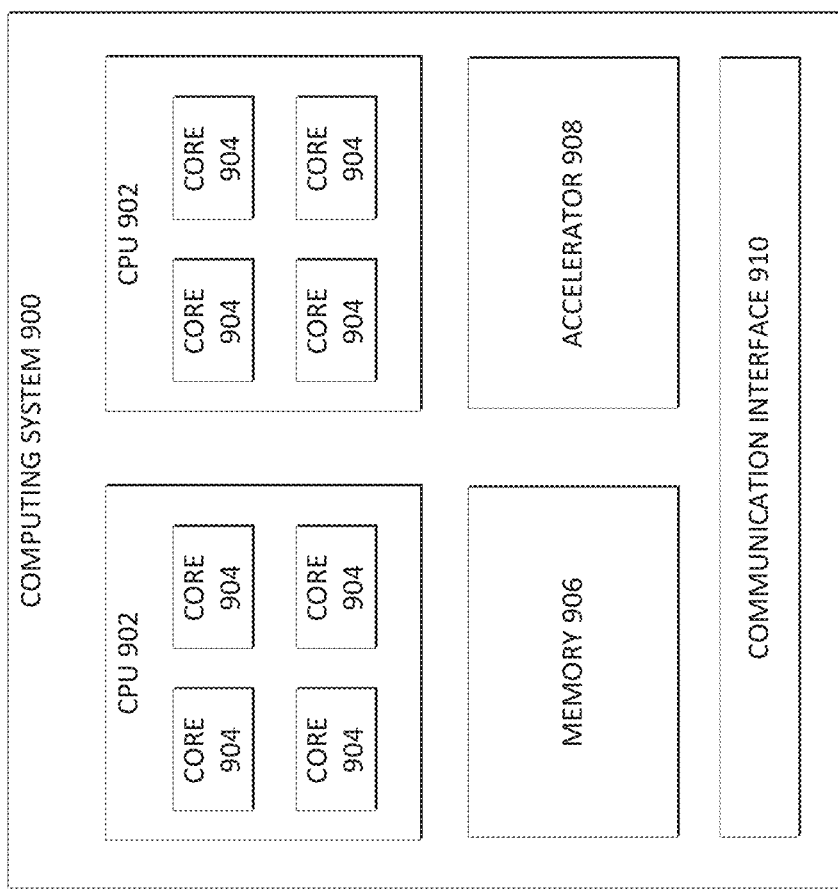
FIG. 9 illustrates an example computing system in accordance with certain embodiments.

FIG. 9 illustrates an example computing system 900 in accordance with certain embodiments. Various entities described herein (e.g., any of the controllers, selector 304, network nodes 102, platforms, etc.) may be implemented using computing system 900 or other suitable computing system. System 900 comprises one or more CPUs 902 each comprising one or more cores 904, a memory 906, accelerator 908, and a NIC 910.

CPU 902 comprises a processor, such as a microprocessor, an embedded processor, a digital signal processor (DSP), a network processor, a handheld processor, an application processor, a co-processor, an SOC, or other device to execute code (e.g., software instructions). CPU 902 in the depicted embodiment, includes four processing elements (cores 904 in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 904 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

Memory 906 may comprise any form of volatile or non-volatile memory including, without limitation, magnetic media (e.g., one or more tape drives), optical media, random access memory (RAM), read-only memory (ROM), flash memory, three dimensional crosspoint memory, phase change memory, removable media, or any other suitable local or remote memory component or components. Memory 906 may be used for short, medium, and/or long term storage by system 900. Memory 906 may store any suitable data or information utilized by system 100, including software embedded in a computer readable medium, and/or encoded logic incorporated in hardware or otherwise stored (e.g., firmware). Memory 906 may store data that is used by cores 904 of CPUs 902. In some embodiments, memory 906 may also comprise storage for instructions that may be executed by the cores 904 of CPUs 902 or other processing elements to provide functionality associated with the network slices 112. Memory 906 may also store the results and/or intermediate results of the various calculations and determinations performed by CPUs 902. In various embodiments, memory 906 may comprise one or more modules of system memory coupled to the CPUs through memory controllers (which may be external to or integrated with CPUs 902). In various embodiments, one or more particular modules of memory 906 may be dedicated to a particular CPU 902 or other processing device or may be shared across multiple CPUs 902 or other processing devices.

Accelerator 908 may comprise any suitable logic to perform specialized processing tasks on behalf of one or more CPUs. Any specialized processing tasks may be performed by accelerator 908, such as graphics processing, cryptography operations, mathematical operations, TCP/IP processing, or other suitable functions. In particular embodiments, accelerator 908 may be coupled to one or more CPUs 902 via a dedicated interconnect. In particular embodiments, accelerator 908 may comprise programmable logic gates. For example, accelerator 908 may be an field-programmable gate array (FPGA). In various embodiments, the accelerator 908 may be located on the same chip as a CPU 902 or on a different chip.

Communication interface 910 may be used for the communication of signaling and/or data between components of the computing system 900 and one or more I/O devices, one or more networks, and/or one or more devices coupled to a network. For example, communication interface 910 may be used to send and receive network traffic such as data packets. In a particular embodiment, communication interface 910 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of system 100 and another device coupled to a network. In various embodiments a NIC may be integrated with a chipset of system 900 (e.g., may be on the same integrated circuit or circuit board as the rest of the chipset logic) or may be on a different integrated circuit or circuit board that is electromechanically coupled to the chipset.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disk may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGs. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various systems or components described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, e.g., reset, while an updated value potentially includes a low logical value, e.g., set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 may comprise a system comprising an interface to access a network slice power consumption parameter for a network slice comprising a logical network between two endpoints through a plurality of physical computing platforms; and a controller comprising circuitry, the controller to specify operating parameters for a plurality of hardware resources of a first physical computing platform in accordance with the network slice power consumption parameter.

Example 2 may comprise the subject matter of Example 1, the controller to further modify the operating parameters for the plurality of hardware resources based on measured power consumption for the network slice on the first physical computing platform and further based on the network slice power consumption parameter.

Example 3 may comprise the subject matter of any one of Examples 1-2, wherein the network slice power consumption parameter is an amount of power that is apportioned to the first physical computing platform from a total amount of network slice power specified by a power budget defined for the network slice.

Example 4 may comprise the subject matter of any one of Examples 1-3, wherein the operating parameters for the plurality of hardware resources of the first physical computing platform comprise frequencies of a plurality of cores to process packets for the network slice.

Example 5 may comprise the subject matter of Example 4, wherein the frequencies comprise a base frequency of a first core of the plurality of cores and a starting frequency of the first core.

Example 6 may comprise the subject matter of any one of Examples 1-5, wherein the operating parameters for the plurality of hardware resources of the first physical computing platform comprise a frequency of an uncore of the first physical computing platform.

Example 7 may comprise the subject matter of any one of Examples 1-6, wherein the controller is to cause incoming packets of the network slice to be blocked based on measured power consumption for the network slice on the first physical computing platform and further based on the network slice power consumption parameter.

Example 8 may comprise the subject matter of any one of Examples 1-7, wherein the controller is to cause incoming packets of the network slice to be queued for future processing based on measured power consumption for the network slice on the first physical computing platform and further based on the network slice power consumption parameter.

Example 9 may comprise the subject matter of any one of Examples 1-8, further comprising the first physical computing platform.

Example 10 may comprise the subject matter of any one of Examples 1-9, wherein the first physical computing platform comprises the interface and the controller.

Example 11 may comprise the subject matter of any one of Examples 1-10, wherein the network slice power consumption parameter is derived from a power budget defined for the network slice.

Example 12 may comprise a system comprising an interface to receive a request to generate a network slice according to a power budget defined for the network slice; and receive power telemetry data and power capabilities data of a plurality of physical computing platforms; and a controller comprising circuitry, the controller to select a subset of the physical computing platforms to implement the network slice based on the power budget defined for the network slice and the power telemetry data and power capabilities data.

Example 13 may comprise the subject matter of Example 12, the controller to split the power budget defined for the network slice among the selected subset of physical computing platforms.

Example 14 may comprise the subject matter of any one of Examples 12-13, the controller to communicate a request to implement a portion of the network slice to a first physical computing platform of the subset, the request specifying a portion of the power budget that has been allocated to the first physical computing platform.

Example 15 may comprise the subject matter of any one of Examples 12-14, the controller to select the subset of the physical computing platforms to implement the network slice further based on a service level agreement defining at least one of latency or packet loss for at least a subset of packets of the network slice Example 16 may comprise a method comprising accessing a network slice power consumption parameter defined for a network slice comprising a logical network between two endpoints through a plurality of physical computing platforms; and determining operating parameters for a plurality of hardware resources of a first physical computing platform in accordance with the network slice power consumption parameter.

Example 17 may comprise the subject matter of Example 16, further comprising modifying the operating parameters for the plurality of hardware resources based on measured power consumption for the network slice on the first physical computing platform and further based on the network slice power consumption parameter.

Example 18 may comprise the subject matter of any one of Examples 16-17, wherein the network slice power consumption parameter is an amount of power that is apportioned to the first physical computing platform from a total amount of network slice power specified by the power budget defined for the network slice.

Example 19 may comprise the subject matter of any one of Examples 16-18, further comprising blocking incoming packets of the network slice to be blocked based on measured power consumption for the network slice on the first physical computing platform and further based on the network slice power consumption parameter.

Example 20 may comprise the subject matter of any one of Examples 16-19, further comprising queuing incoming packets of the network slice to be blocked based on measured power consumption for the network slice on the first physical computing platform and further based on the network slice power consumption parameter.

Example 21 may comprise the subject matter of any one of Examples 16-20, further comprising selecting a subset of a plurality of physical computing platforms to implement the network slice based on the power budget defined for the network slice and power telemetry data and power capabilities data of the plurality of physical computing platforms.

Example 22 may comprise least one non-transitory machine readable storage medium having instructions stored thereon, the instructions when executed by a machine to cause the machine to access a network slice power consumption parameter for a network slice comprising a logical network between two endpoints through a plurality of physical computing platforms; and determine operating parameters for a plurality of hardware resources of a first physical computing platform in accordance with the network slice power consumption parameter.

Example 23 may comprise the subject matter of Example 22, the instructions to cause the machine to modify the operating parameters for the plurality of hardware resources based on measured power consumption for the network slice on the first physical computing platform and further based on the network slice power consumption parameter.

Example 24 may comprise the subject matter of any one of Examples 22-23, wherein the network slice power consumption parameter is an amount of power that is apportioned to the first physical computing platform from a total amount of network slice power specified by a power budget defined for the network slice.

Example 25 may comprise the subject matter of any one of Examples 22-24, wherein the operating parameters for the plurality of hardware resources of the first physical computing platform comprise frequencies of a plurality of cores to process packets for the network slice.

Example 26 may comprise the subject matter of Example 25, wherein the frequencies comprise a base frequency of a first core of the plurality of cores and a starting frequency of the first core.

Example 27 may comprise the subject matter of any one of Examples 22-26, wherein the operating parameters for the plurality of hardware resources of the first physical computing platform comprise a frequency of an uncore of the first physical computing platform.

Example 28 may comprise the subject matter of any one of Examples 22-27, wherein the instructions are to cause the machine to cause incoming packets of the network slice to be blocked based on measured power consumption for the network slice on the first physical computing platform and further based on the network slice power consumption parameter.

Example 29 may comprise the subject matter of any one of Examples 22-28, wherein the instructions are to cause the machine to cause incoming packets of the network slice to be queued for future processing based on measured power consumption for the network slice on the first physical computing platform and further based on the network slice power consumption parameter.

Example 30 may comprise the subject matter of any one of Examples 22-29, further comprising the first physical computing platform.

Example 31 may comprise the subject matter of any one of Examples 22-30, wherein the first physical computing platform comprises the interface and the controller.

Example 32 may comprise the subject matter of any one of Examples 22-31, wherein the network slice power consumption parameter is derived from a power budget defined for the network slice.

Example 33 may comprise least one non-transitory machine readable storage medium having instructions stored thereon, the instructions when executed by a machine to cause the machine to receive a request to generate a network slice according to a power budget defined for the network slice; and receive power telemetry data and power capabilities data of a plurality of physical computing platforms; and select a subset of the physical computing platforms to implement the network slice based on the power budget defined for the network slice and the power telemetry data and power capabilities data.

Example 34 may comprise the subject matter of Example 33, the instructions to cause the machine to split the power budget defined for the network slice among the selected subset of physical computing platforms.

Example 35 may comprise the subject matter of any one of Examples 33-34, the instructions to cause the machine to communicate a request to implement a portion of the network slice to a first physical computing platform of the subset, the request specifying a portion of the power budget that has been allocated to the first physical computing platform.

Example 36 may comprise the subject matter of any one of Examples 33-35, the instructions to cause the machine to select the subset of the physical computing platforms to implement the network slice further based on a service level agreement defining at least one of latency or packet loss for at least a subset of packets of the network slice.

What is claimed is:

1. A system comprising:
an interface to access a network slice power consumption parameter for a network slice comprising a logical network between two endpoints through a plurality of physical computing platforms; and
a controller comprising circuitry, the controller to:
specify operating parameters for a plurality of hardware resources of a first physical computing platform in accordance with the network slice power consumption parameter; and
cause incoming packets of the network slice to be blocked or queued based on measured power consumption for the network slice on the first physical computing platform and further based on the network slice power consumption parameter.

2. The system of claim 1, the controller to further modify the operating parameters for the plurality of hardware resources based on measured power consumption for the network slice on the first physical computing platform and further based on the network slice power consumption parameter.

3. The system of claim 1, wherein the network slice power consumption parameter is an amount of power that is apportioned to the first physical computing platform from a total amount of network slice power specified by a power budget defined for the network slice.

4. The system of claim 1, wherein the operating parameters for the plurality of hardware resources of the first physical computing platform comprise frequencies of a plurality of cores to process packets for the network slice.

5. They system of claim 4, wherein the frequencies comprise a base frequency of a first core of the plurality of cores and a starting frequency of the first core.

6. The system of claim 1, wherein the operating parameters for the plurality of hardware resources of the first physical computing platform comprise a frequency of an uncore of the first physical computing platform.

7. The system of claim 1, wherein the controller is to cause incoming packets of the network slice to be blocked based on measured power consumption for the network slice on the first physical computing platform and further based on the network slice power consumption parameter.

8. The system of claim 1, wherein the controller is to cause incoming packets of the network slice to be queued for future processing based on measured power consumption for the network slice on the first physical computing platform and further based on the network slice power consumption parameter.

9. The system of claim 1, further comprising the first physical computing platform.

10. The system of claim 1, wherein the first physical computing platform comprises the interface and the controller.

11. The system of claim 1, wherein the network slice power consumption parameter is derived from a power budget defined for the network slice.

12. A method comprising:
selecting a subset of a plurality of physical computing platforms to implement a network slice based on a power budget defined for the network slice and power telemetry data and power capabilities data of the plurality of physical computing platforms;
accessing a network slice power consumption parameter for the network slice, the network slice comprising a logical network between two endpoints through the subset of the plurality of physical computing platforms; and
determining operating parameters for a plurality of hardware resources of a first physical computing platform in accordance with the network slice power consumption parameter.

13. The method of claim 12, further comprising modifying the operating parameters for the plurality of hardware resources based on measured power consumption for the network slice on the first physical computing platform and further based on the network slice power consumption parameter.

14. The method of claim 12, wherein the network slice power consumption parameter is an amount of power that is apportioned to the first physical computing platform from a total amount of network slice power specified by the power budget defined for the network slice.

15. The method of claim 12, further comprising blocking incoming packets of the network slice based on measured power consumption for the network slice on the first physical computing platform and further based on the network slice power consumption parameter.

16. The method of claim 12, further comprising queuing incoming packets of the network slice based on measured power consumption for the network slice on the first physical computing platform and further based on the network slice power consumption parameter.

17. At least one non-transitory machine readable storage medium having instructions stored thereon, the instructions when executed by a machine to cause the machine to:
access a network slice power consumption parameter for a network slice comprising a logical network between two endpoints through a plurality of physical computing platforms;
determine operating parameters for a plurality of hardware resources of a first physical computing platform in accordance with the network slice power consumption parameter; and
block or queue incoming packets of the network slice based on measured power consumption for the network slice on the first physical computing platform and further based on the network slice power consumption parameter.

18. The medium of claim 17, wherein the network slice power consumption parameter is derived from a power budget defined for the network slice.

* * * * *